United States Patent [19]

Dunn

[11] 4,339,061

[45] Jul. 13, 1982

[54] ACCESSORY CASE FOR A WHEEL CHAIR

[75] Inventor: Philip Dunn, Morton Grove, Ill.

[73] Assignee: Philbag Co., Inc., Chicago, Ill.

[21] Appl. No.: 206,352

[22] Filed: Nov. 13, 1980

[51] Int. Cl.³ ........................ A45C 3/00; A45C 13/00; A45C 15/00; B60R 11/00

[52] U.S. Cl. ................................ 224/42.42; 116/67 R; 116/DIG. 44; 150/30; 190/51; 224/32 R; 224/42.46 R; 224/273; 224/901; 280/289 WC; 297/DIG. 4

[58] Field of Search .................. 190/51; 150/30, 52 J; 280/289 WC, 289 A, 769; 116/67 R, DIG. 44; 224/273, 901, 32 R, 32 A, 33 R, 33 A, 35, 36, 42.46 R, 42.42; 297/DIG. 4

[56] References Cited

U.S. PATENT DOCUMENTS

| | | | |
|---|---|---|---|
| Re. 24,817 | 4/1960 | Hogan | 297/6 |
| 444,642 | 1/1891 | Allen, Jr. et al. | 224/35 |
| 470,878 | 3/1892 | Meast | 224/36 |
| 522,186 | 7/1894 | Andrews | 224/35 |
| 2,692,573 | 10/1954 | Bakal | 116/67 R |
| 3,813,017 | 5/1974 | Pinsleur | 150/52 J X |
| 3,955,728 | 5/1976 | Jackson et al. | 224/36 X |
| 4,158,428 | 6/1979 | Bates | 280/289 WC X |
| 4,212,377 | 7/1980 | Weinreb | 150/52 J |
| 4,279,342 | 7/1981 | Van Pelt | 206/542 |

FOREIGN PATENT DOCUMENTS

| | | | |
|---|---|---|---|
| 22421 | of 1895 | United Kingdom | 224/32 |

*Primary Examiner*—Allan N. Shoap

*Attorney, Agent, or Firm*—Silverman, Cass & Singer, Ltd.

[57] ABSTRACT

An accessory case including a generally rectangular, box-like container having a hinged cover for mounting on the arm rest of a wheel chair. The case has a bottom wall having a forward position generally parallel to the cover, a rear portion which is canted or angled rearwardly and upwardly toward the cover generally. The case is mounted on the wheel chair with said cover approximately at the level of the arm rest, and with said canted portion of the bottom wall spaced from the wheel chair drive ring leaving same free to be manipulated. Structure is provided on the cover for signalling a distress signal and which is situated for convenient opening of the cover by a wheel chair occupant. An interior partition arrangement for the case within convenient reach of the chair occupant is provided.

10 Claims, 6 Drawing Figures

FIG. 1
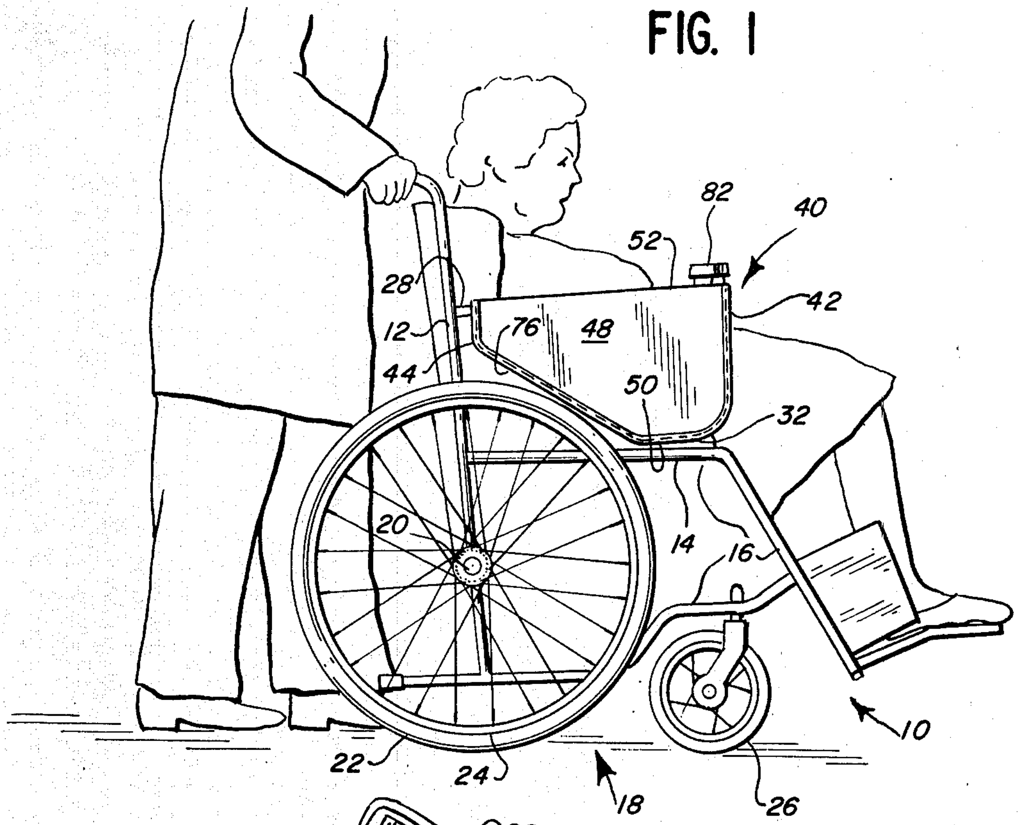
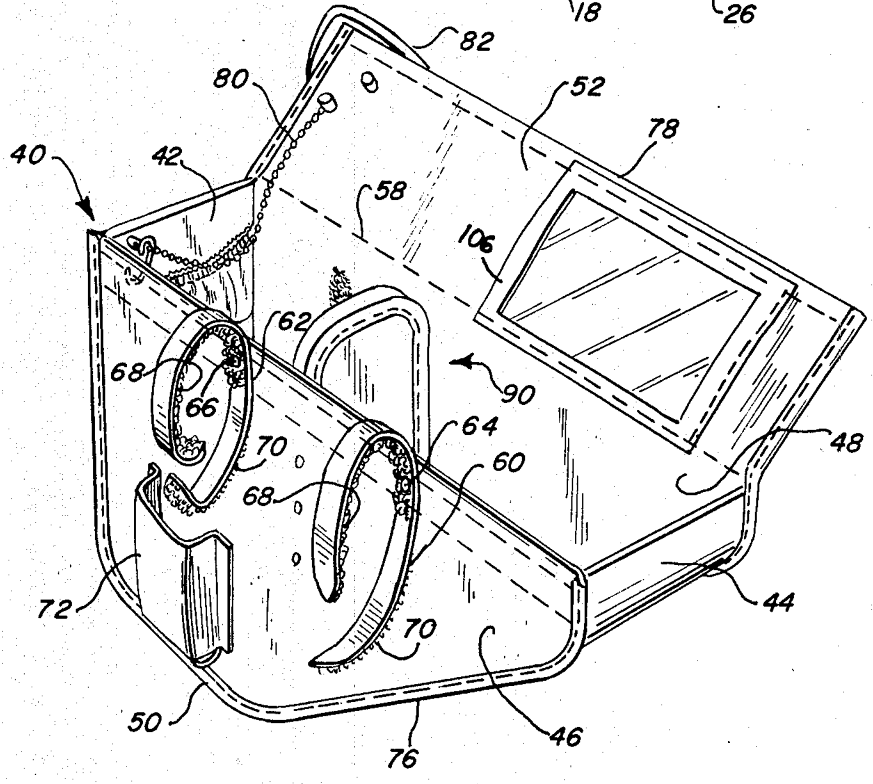
FIG. 2

FIG. 3
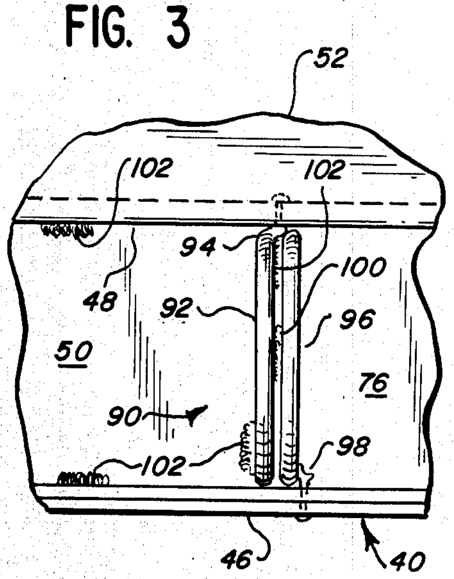
FIG. 4
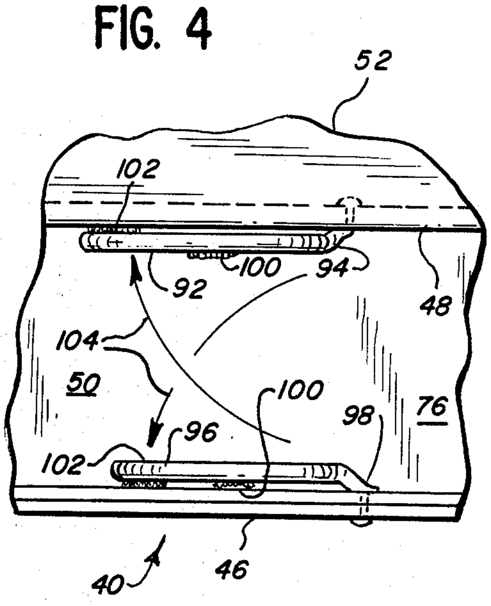
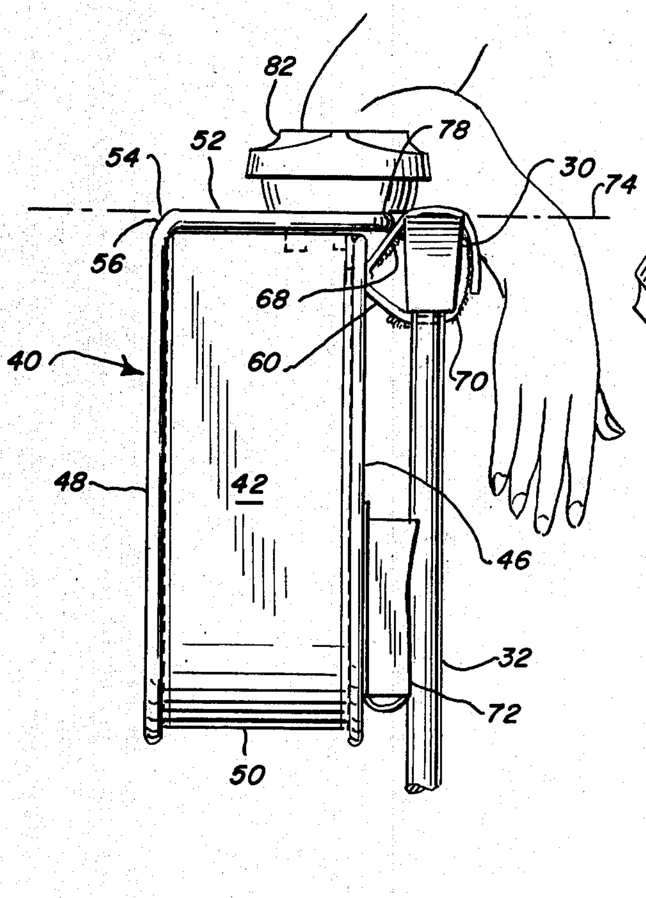
FIG. 5
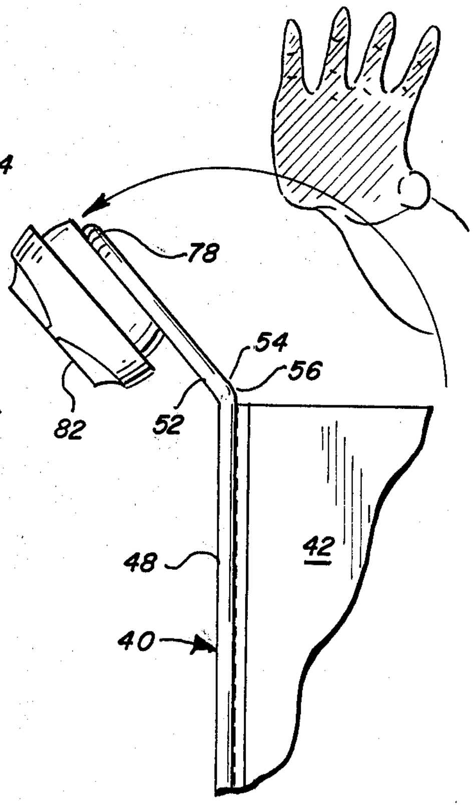
FIG. 6

ACCESSORY CASE FOR A WHEEL CHAIR

BACKGROUND OF THE INVENTION

The invention relates generally to accessory cases or article carriers adapted to be installed on vehicles, and in particular, relates to a novel accessory case especially suitable for installation on a wheel chair within convenient reach of the occupant and constructed to clear the wheel chair drive ring so that the occupant can propel and steer the wheel chair.

Article carriers or cases for installation on vehicles generally are known. They are mounted on or fastened to the vehicles and carry or contain goods, implements or personal articles. Examples of such are described in U.S. Pat. No. 4,032,054 for an article carrier strapped to a golf bag, and U.S. Pat. No. 3,409,193 for a bifurcated article carrier resting straddled over an upwardly projecting support.

A further example is described in U.S. Pat. No. 2,290,099 where a baby walker is provided with a package carrier or carry-all. The package carrier provides two rectangular cloth enclosures open at the top. The frame is formed of front and rear members resting on the top of the baby walker and projecting beyond both sides of the baby walker. The enclosures are suspended between the front and rear members, one on each side of the walker. A baby is carried in the walker between the front and rear members and the two side enclosures.

Article carriers for vehicles used in aiding the transportation or locomotion of disabled or handicapped people also are known. One such carrier is described in U.S. Pat. No. Re. 24,817. There, an invalid walker is provided with a trough-like basket extending across the front of the walker for carrying the articles. It appears, however, that the basket must be removed and replaced every time a user enters and leaves the walker, causing an obvious inconvenience. Further, the basket must be stored, if not replaced on the walker after a user leaves the walker.

Article carriers for wheel chairs which are known are such as conventional cloth of plastic bags hung from the wheel chair back rest. The major problem with such bags is that they are almost totally beyond the reach of the wheel chair occupant from the seat of the wheel chair. Considering the disabilities and handicaps of persons relegated to wheel chairs, it can be understood that this inaccessability leads to great frustration of such a person trying to care at least partially for himself. Much could be done to return dignity to such a person if an article carrier could be provided which is within convenient reach of the wheel chair occupant.

Moreover, the interior of such a bag even if the bag is placed within convenient reach, is relatively inaccessible by a person lacking dexterity in their hands and arms. The top edges of such a bag tend to remain closed thereby frustrating efforts of access to the contents of the bag or even to see the contents for selecting particular ones.

Further, to hang such a bag from the arm rest of a wheel chair is likely to interfere with propelling and steering the chair by means of the conventional drive ring cooperating with the chair wheels. Insofar as is known, an accessory case for a wheel chair installed along a side of the chair, such as from the chair's arm rest, is not known to the inventor.

SUMMARY OF THE INVENTION

These and other problems are overcome by the accessory case constructed and arranged in accordance with the invention.

The accessory case provides a generally rectangular hollow, box-like container having a hinged cover. The case includes parallel front and rear end walls, a bottom wall, a pair of opposed and parallel side walls and a top wall hinged along one edge to the top edge of one side wall.

The bottom wall includes a rear portion which is angled rearwardly and upwardly relative to the remainder of the bottom wall. Strap means are provided on the exterior of the other side wall for mounting the case on a wheel chair with the straps wrapped around a horizontal arm rest of the wheel chair. When mounted on the wheel chair, the angled rear portion of the bottom wall is aligned over a drive wheel of the wheel chair and the top wall is at about the same level as the arm rest. Means providing a knob are provided on top of the top wall to facilitate opening and closing the case. The case has a width less than the distance from the drive ring on the drive wheel to the frame not to interfere with the occupant manually rotating the drive ring to propel the wheel chair.

The knob may include an alarm to summon aid with and the case includes a collapsible partition.

BRIEF DESCRIPTION OF THE DRAWING

FIG. 1 is a side elevation view of a conventional wheel chair having mounted thereon an accessory case constructed and arranged in accordance with the invention;

FIG. 2 is a perspective view of the accessory case of the invention;

FIG. 3 is a fragmentary top view of the accessory case illustrating a partition in a closed position;

FIG. 4 is a fragmentary top view of the accessory case similar to FIG. 3 illustrating the partition in an open position;

FIG. 5 is a front elevation view of the accessory case illustrating a top wall in a closed position; and FIG. 6 is a front elevation view of the accessory case similar to FIG. 5 illustrating the top wall in an open position.

DESCRIPTION OF THE PREFERRED EMBODIMENT

In FIG. 1 there is illustrated a wheel chair of conventional design illustrated generally by the reference character 10. Wheel chair 10 includes a frame comprised of vertical member 12, horizontal seat support member 14, and lower member 16.

Wheel chair 10 further includes a drive wheel 18 rotatably secured on axle 20 projected from vertical member 12. Drive wheel 18 includes tire 22 and hand ring 24 spaced outwardly therefrom. Hand ring 24 has a smaller diameter than tire 22 and is concentric therewith.

In operation, hand ring 24 is rotated by a person sitting in wheel chair 10 to propel the wheel chair. A caster wheel 26 is provided depending from lower member 16 to provide stability. It will be understood that there are two drive wheels 18 and castor wheels 26 on wheel chair 10, one of each on each side.

Wheel chair 10 further includes an arm rest member 28 projecting horizontally from vertical member 12 to provide an arm rest 30 for the wheel chair occupant. See also FIG. 5. The other end of arm rest member 28 is supported by support member 32 projecting upwardly from seat support member 14.

The structure thus far described, except for the drive wheels and castor wheels is interconnected together to form a rigid, conventional wheel chair vehicle, capable of transporting a person sitting therein.

Fastened to one side of wheel chair 10 is an accessory case indicated generally by the reference character 40. As is illustrated in FIGS. 1–6, case 40 is a box-like receptacle having a hinged cover for carrying such as personal items, etc. of the wheel chair occupant.

Case 40 includes a pair of front and rear end walls 42 and 44, a pair of opposed, parallel side walls 46 and 48, a bottom wall 50 and a top wall 52 generally parallel with a forward portion of bottom wall 50, interconnected to form a generally rectangular, hollow, box-like receptacle which may be accessed by raising top wall 52.

Top wall 52 is hinged along one edge 54 thereof to the top edge 56 of side wall 48 (See FIG. 5). In the preferred embodiment top wall 52 is integral with side wall 48 with the hinge being formed by a sewing seam 58 illustrated in FIG. 2.

Case 40 includes two straps 60 and 62 attached to the exterior of side wall 46 by fasteners 64 and 66, respectively. Straps 60 and 62 have fastening materials 68 and 70 on opposing ends thereof so that straps 60 and 62 may be formed into loops of varying diameter.

Although not specifically shown, the attachment straps 60 and 62 may be mounted to be adjustable one relative to the other by providing slots for the fasteners 64 and 66 which will accommodate lateral movement of the straps one relative to the other. Such adjustability is desirable for different kinds of arm rests.

Case 40 is fastened to wheel chair 10 by straps 60 and 62 being formed into loops around arm rest 30. A bumper member 72 is carried on the exterior of side wall 46 and is located so as to abut against support member 32. Bumper member 72 serves to maintain case 40 aligned vertically and absorb any shock which would otherwise be transmitted from support member 32 to side wall 46 and case 40. Bumper member 72 is carried by side wall 46, by such as being glued or sewn thereto. Case 40 has a width between side walls which is less than the distance from seat support 14 to ring 24 so that the wheel chair occupant may reach easily the ring 24 for propelling the wheel chair.

When attached to wheel chair 10, case 40 is aligned substantially vertically and so that top wall 52 approximately is level with a plane 74 (FIG. 5) defined by the top edge of arm rest 30. Case 40 further is aligned so that a rear portion 76 of bottom wall 50 is above drive wheel 18.

The rear portion 76 is canted or angled rearwardly and upwardly toward top wall 52 generally at an angle of between 0° and 90° relative to the remainder of bottom wall 50. As illustrated in FIG. 1, in the preferred embodiment this angle is about 45°. Rear portion 76 of bottom wall 50 is angled upwardly and rearwardly to clear or avoid interference with drive wheel 18 when case 40 is attached to wheel chair 10.

At an angle of about 0°, the depth of case 40 is limited by the distance from plane 74 to the top of drive wheel 18 and the length of case 40 may be equal to the length of member 28 and arm rest 30 as desired. At an angle of about 90°, case 40 may have a depth as desired, but the length thereof is limited by the distance from the front of arm rest 30 to drive wheel 18. In the preferred embodiment the angle of rear portion 76 is selected to provide sufficient depth of case 40 for the carrying of personal items and so that those items may be accessed easily by persons who may have physical disabilities.

As has been explained, the interior of case 40 is accessed by raising top wall 52. In a closed position (FIG. 5), top wall 52 rests on the top edges of front and rear end walls 42 and 44 and side wall 46, with a free edge 78 protruding beyond side wall 46. In an open position (FIG. 6), top wall 52 is pivoted or swung around edge 54 to open the top of case 40. Top wall 52 is limited in its travel by such as a chain 80 (FIG. 2) attached thereto and to side wall 46.

The opening of the case 40 by pivoting top wall 52 to its open position is facilitated by edge 78 protruding over side wall 46 and by means providing a knob 82. With knob 82 even an occupant of wheel chair 10 lacking dexterity in his hand may pivot easily top wall 52 to the open position. Additionally, knob 82 may provide an alert in the form of an audible signal to summon aid to the occupant of the wheel chair. In the preferred embodiment this alert is initiated by actuating a switch on the top of knob 82.

Additionally, case 40 is provided with a collapsible partition 90 illustrated in FIGS. 2–4. Partition 90 divides the interior of case 40 into two compartments and is provided to prevent items in case 40 over rear portion 76 from rolling or sliding into the front portion of the case due to the rear portion 76 being angled upwardly.

Partition 90 includes a wing 92 hinged along one edge 94 to side wall 48 and a wing 96 hinged along one edge 98 to side wall 46. Wings 92 and 96 carrying fastening materials 100 to fasten wings 92 and 96 to one another in a closed position. Wings 92 and 96 and side walls 46 and 48 carry fastening materials 102 to fasten the wings to the side walls in an open position. The free edges of wings 92 and 96 are swung or pivoted as illustrated by arrows 104 to pivot the wings from the partition position to the open position. Wings 92 and 96 may be swung as desired, but when the angle of rear portion 76 is great, rear portion 76 interferes with wings 92 and 96 being swung thereover.

In the preferred embodiment the walls of case 40 are formed of a pliable material with the side walls 46 and 48 and top wall 52 being provided with a stiff material such as cardboard. This stiff material gives the side walls their shape and reduces sagging. The pliable front and rear end walls 42 and 44 and bottom wall 50 provide case 40 with a degree of resiliency to reduce injury to a person striking or being struck by case 40 and so that the arm of the wheel chair occupant may compress case 40 to some degree when rotating ring 24 to propel the wheel chair 10. In the preferred embodiment the walls, bumpers and wings of case 40 are interconnected by being sewn together, although other methods may be used. Additionally, personal conveniences are provided such as a window pouch 106 sewn to the bottom surface of top wall 52 for displaying such as a mirror or identification information.

The fastener materials used on the straps and partition wings may be as desired and in the preferred embodiment are the synthetic materials which adhere when pressed together sold under the VELCRO trademark.

Modifications and variations of the present invention are possible in light of the above teachings. It is, therefore, to be understood that within the scope of the appended claims, the invention may be practiced otherwise than as specifically described.

What is claimed is:

1. An accessory case for use with a conventional wheel chair, the wheel chair having a frame providing a substantially horizontal arm rest and a drive wheel rotatably connected to the frame, the drive wheel including a manually rotatable ring spaced a distance from the frame outward from the arm rest; said accessory case comprising:

front and rear end walls, a bottom wall, opposed side walls including an inner side wall positionable adjacent the wheel chair arm rest and an outer side wall spaced therefrom, and a top wall interconnected together to form a covered container, the top wall extending between said side walls and being hingedly connected along one edge thereof to a top edge of the outer side wall, the top wall being swingable between an open position in which the top of the container is open, and a covered position in which the top of the container is covered by the top wall with the top wall overlying the top edge of the inner side wall and defining means to enable direct access to the interior of the case by an occupant of the chair;

said bottom wall including a substantially horizontal forward portion positionable generally forward of the drive wheel and a rearward portion angled upwardly and rearward relative to the forward portion to position the rearward portion in spaced overlying relation to the wheel chair drive wheel, the width of the container from side wall to side wall being less than the distance from the rotatable ring to the wheel chair frame; and fastening means on the inner side wall selectively engageable with the wheel chair for mounting the container adjacent and immediately outward of the arm rest with the top wall in the closed position being substantially at the level of the arm rest.

2. The case as claimed in claim 1 in which the width of the top wall is greater than the width of the front and rear end walls and the bottom wall, said top wall protruding past and resting on the top edge of the inner side wall when in the covered position to provide the means enabling access to the interior of the case.

3. The case as claimed in claim 2 wherein said top wall is substantially planar.

4. The case as claimed in claim 1 in which the top wall includes a protuberance comprising a knob including alarm means for providing an audible alert upon contact by a chair occupant.

5. The case as claimed in claim 1 in which the rearward portion of the bottom wall is at an angle of about 45° relative to the forward portion of the bottom wall.

6. The case as claimed in claim 1 in which the means for mounting the container include two straps which are fastened to the inner side wall, and means for accommodating lateral movement of the straps one relative to the other.

7. An accessory case for a conventional wheel chair, the wheel chair having a frame providing a substantially horizontal arm rest and a drive wheel rotatably connected to the frame, the drive wheel including a manually rotatable ring spaced outward from the frame, the case comprising:

front and rear end walls, a bottom wall, opposed side walls and a top wall interconnected together to form a covered container, the top wall being hingedly connected along one edge thereof to a top edge of one side wall, the top wall being swingable between an open position in which the top of the container is open, and a covered portion in which the top of the container is covered by the top wall;

a portion of the bottom wall being angled rearwardly and upwardly relative to the remainder of the bottom wall and the width of the container from side wall to side wall being less than the distance from the rotatable ring to the wheel chair frame;

means on the other side wall for mounting the container on the arm rest with the top wall in the closed position being substantially at the level of the arm rest and with the portion of the bottom wall above the drive wheel; and partition means connected on the interior between said side walls of the case, said partition means including two wings hingedly connected along edges thereof to the opposed side walls, the two wings being swingable around their respective hinge connections between a partition position in which the wings are fastened to one another and divide the case into two compartments and an open position in which the wings are fastened to the side walls.

8. The case as claimed in claim 7 in which the hinged connections of the wings to the side walls are opposite one another and both wings are swingable in the same directions.

9. The case as claimed in claim 8 in which the wings are swingable towards the front wall.

10. The case as claimed in claim 7 in which there are fastener means carried by both wings and the side walls for fastening the wings to one another and the side walls.

* * * * *